United States Patent
Thomas et al.

(10) Patent No.: US 8,964,018 B2
(45) Date of Patent: Feb. 24, 2015

(54) VIDEO DISPLAY SYSTEMS

(75) Inventors: Fred Charles Thomas, Fort Collins, CO (US); Oliver Brandt, Fort Collins, CO (US); John Michael Main, Fort Collins, CO (US); Derek W. Hanson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 294 days.

(21) Appl. No.: 13/259,385

(22) PCT Filed: Oct. 30, 2009

(86) PCT No.: PCT/US2009/062810
§ 371 (c)(1),
(2), (4) Date: Sep. 23, 2011

(87) PCT Pub. No.: WO2011/053315
PCT Pub. Date: May 5, 2011

(65) Prior Publication Data
US 2012/0019646 A1    Jan. 26, 2012

(51) Int. Cl.
*H04N 7/18* (2006.01)
*H04N 5/64* (2006.01)
*G02B 27/00* (2006.01)
*H04N 7/14* (2006.01)
*H04N 21/422* (2011.01)

(52) U.S. Cl.
CPC .............. *H04N 5/64* (2013.01); *G02B 27/0093* (2013.01); *H04N 7/144* (2013.01); *H04N 21/422* (2013.01)
USPC .......................................................... 348/78

(58) Field of Classification Search
USPC .......................................................... 348/78
See application file for complete search history.

(56) References Cited

U.S. PATENT DOCUMENTS

| | | | | |
|---|---|---|---|---|
| 4,400,725 A | * | 8/1983 | Tanigaki | 348/14.16 |
| 5,406,323 A | * | 4/1995 | Tanigaki et al. | 348/14.1 |
| 5,612,732 A | * | 3/1997 | Yuyama et al. | 348/14.01 |
| 5,612,734 A | * | 3/1997 | Nelson et al. | 348/14.16 |
| 5,903,706 A | * | 5/1999 | Wakabayashi et al. | 386/224 |
| 6,583,864 B1 | * | 6/2003 | Stanners | 356/71 |
| 6,750,848 B1 | * | 6/2004 | Pryor | 345/168 |
| 8,514,260 B2 | * | 8/2013 | Large et al. | 348/14.01 |
| 2002/0015102 A1 | * | 2/2002 | Itoh et al. | 348/333.06 |
| 2002/0030834 A1 | * | 3/2002 | Watanabe et al. | 358/1.9 |

(Continued)

FOREIGN PATENT DOCUMENTS

| | | |
|---|---|---|
| KR | 1020050066197 | 6/2005 |
| KR | 100588742 | 6/2006 |
| KR | 100764406 | 10/2007 |

OTHER PUBLICATIONS

International Searching Authority, International Search Report and Written Opinion, Appln no. PCT/US2009/062810, date of mailing Jul. 29, 2010, 10 p.

*Primary Examiner* — Sath V Perungavoor
*Assistant Examiner* — Peter D Le
(74) *Attorney, Agent, or Firm* — Hewlett-Packard Development Company (57) ABSTRACT

Various embodiments of the present invention are directed to video display systems. In one embodiment, a video display system comprises a display screen; and a video capturing system. The video capturing system is configured to capture line-of-sight video images of a video display user's face and eyes while the display user looks at the display screen, enabling establishment of eye contact between the video display user and the person exhibited on the display.

20 Claims, 8 Drawing Sheets

(56) References Cited

U.S. PATENT DOCUMENTS

| | | | |
|---|---|---|---|
| 2002/0093493 A1* | 7/2002 | Michaeli et al. | 345/173 |
| 2002/0093568 A1* | 7/2002 | Chumbley | 348/207 |
| 2002/0147033 A1* | 10/2002 | Ban et al. | 455/566 |
| 2002/0181722 A1* | 12/2002 | Hibino et al. | 381/92 |
| 2003/0041871 A1* | 3/2003 | Endo et al. | 132/301 |
| 2003/0058334 A1* | 3/2003 | Boyden et al. | 348/14.08 |
| 2003/0199290 A1* | 10/2003 | Viertola | 455/575.1 |
| 2003/0228847 A1* | 12/2003 | Matsumoto | 455/90.3 |
| 2004/0080688 A1* | 4/2004 | Ishida | 349/113 |
| 2004/0189791 A1* | 9/2004 | Haruki | 348/14.01 |
| 2004/0246340 A1* | 12/2004 | Sukenari et al. | 348/207.99 |
| 2004/0257473 A1* | 12/2004 | Miyagawa | 348/571 |
| 2005/0104848 A1* | 5/2005 | Yamaguchi et al. | 345/156 |
| 2005/0175257 A1* | 8/2005 | Kuroki | 382/278 |
| 2006/0034042 A1* | 2/2006 | Hisano et al. | 361/681 |
| 2006/0128429 A1* | 6/2006 | Cha | 455/556.1 |
| 2006/0152578 A1* | 7/2006 | Kim | 348/14.01 |
| 2006/0164799 A1* | 7/2006 | Varela | 361/680 |
| 2007/0063977 A1* | 3/2007 | Kuo | 345/168 |
| 2007/0116454 A1* | 5/2007 | Tsai | 396/287 |
| 2007/0152986 A1* | 7/2007 | Ogawa | 345/179 |
| 2007/0154194 A1* | 7/2007 | Yoon et al. | 396/50 |
| 2008/0106592 A1* | 5/2008 | Mikami | 348/14.16 |
| 2008/0294017 A1* | 11/2008 | Gobeyn et al. | 600/301 |
| 2008/0294018 A1* | 11/2008 | Kurtz et al. | 600/301 |
| 2009/0027319 A1* | 1/2009 | Chen | 345/87 |
| 2009/0079813 A1* | 3/2009 | Hildreth | 348/14.03 |
| 2011/0134255 A1* | 6/2011 | Kim et al. | 348/207.1 |
| 2011/0285669 A1* | 11/2011 | Lassesson et al. | 345/175 |
| 2012/0320198 A1* | 12/2012 | Yasutake | 348/143 |

* cited by examiner

VIDEO DISPLAY SYSTEMS

TECHNICAL FIELD

Embodiments of the present invention relate to video technology.

BACKGROUND

With the advent of web cameras, personal computers and laptops are increasingly being used as video telephones enabling two or more people in different locations to engage in face-to-face, real-time communications over the Internet. Web cameras can be implemented as stand alone video capture devices connected to a computer using wired connections such as a universal serial bus ("USB") or FireWire (1392) or they can be connected to a computer network using Ethernet or Wi-Fi. In recent years, laptop monitors have become available with a single web camera integrated into the top center of the monitor frame. Designers and users of web camera technologies continue to seek improvements to the video telephone experience.

DETAILED DESCRIPTION

Many web camera users argue that a number of issues prevent web cameras from becoming a standard part of Internet-based telephone communications. One major issue is lack of eye contact, which plays a major role in conversational communications, perceived attention and intent, and other important aspects of natural face-to-face communication. For example, consider a first person and a second person engaged in a video telephone conversation. When the first person looks at the second person displayed on a monitor, the first person is not looking into the camera, resulting in the second person getting a view of the first person without eye contact. On the other hand, when the first person looks at the camera, the first person at best gets a peripheral view of the second person displayed on the monitor. Thus, typical video telephone conversations are arguably worse than traditional telephone conversations that provide no eye contact cues, because web camera technologies can create the false impression that the participants are either avoiding eye contact or are distracted.

Various embodiments of the present invention are directed to video display systems that enable video display users to engage in face-to-face, real-time, audio-visual communications with eye contact. In particular, video display system embodiments are implemented with one of a number of different types of video capturing systems described herein. Each video capturing system is configured to capture line-of-sight video of a video display user's face and eyes while the display exhibits the face another person, enabling the establishment of eye contact between the video display user and the person exhibited on the display as follows. First, embodiments include a video capturing system incorporated in the video display so that the video imager of the video capturing system is nearly in-line with the video display user's face and eyes. Second, embodiments include a video capturing system configured with two or more off-axis video imagers that simultaneous capture video images of the video display user from different vantage points. The captured video images can be processed in real-time to re-construct a frontal line-of-sight view of the video display user for exhibition on another person's video display. Third, embodiments include a video capturing systems configured with reflective components that aid in capturing line-of-sight video images of a display user's face.

Embodiments of the present invention include solid-state imager sensors, called "solid-state imagers," that convert an optical image into an electronic signal. Solid-state imagers comprise an array of linked, or coupled, light sensitive photocells that form a photosensitive area. Solid-state imagers include, but are not limited to, charge-coupled devices, charge-injection devices, and complementary metal-oxide-semiconductor sensors.

Figure 1:
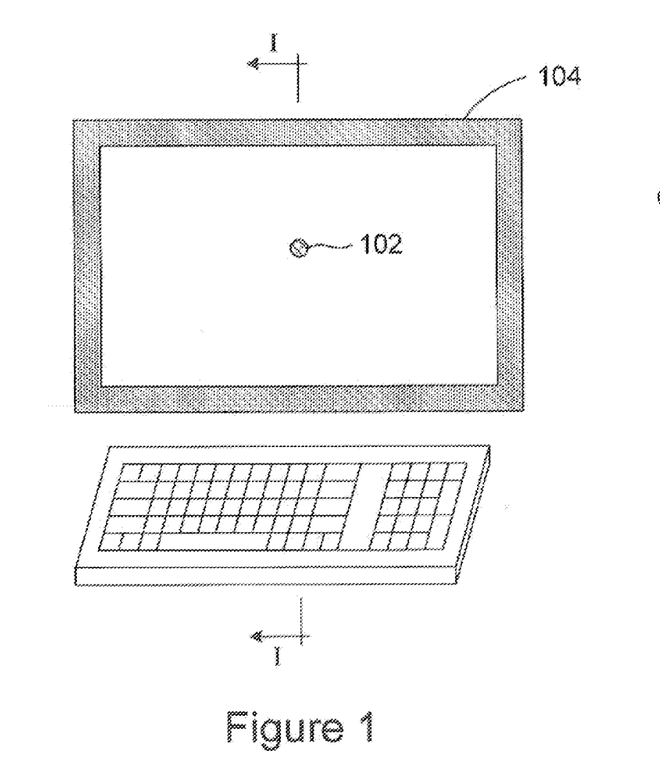
FIG. 1 shows a frontal-view of a first display configured in accordance with one or more embodiments of the present invention.

FIG. 1 shows a frontal-view of an exemplary first video display system comprising a solid-state imager 102 located in the approximate center of a display 104 in accordance with one or more embodiments of the present invention.

Figure 2:
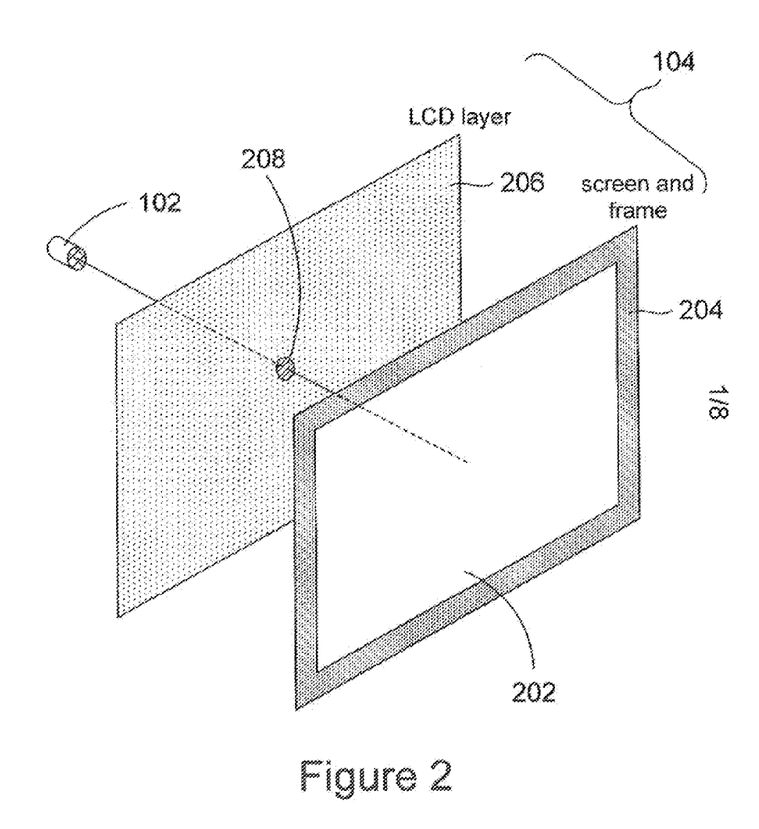
FIG. 2 shows an exploded isometric view of the display, shown in FIG. 1, configured in accordance with one or more embodiments of the present invention.

FIG. 2 shows an exploded isometric view of the display 104 and the solid-state imager 102 configured in accordance with one or more embodiments of the present invention. As shown in the example of FIG. 2, the display 104 includes a screen 202 surrounded by a frame 204, a liquid-crystal display ("LCD") layer 206 located behind the screen 202, and the solid-state imager 102 located behind the approximate center of the LCD layer 206. In order for the solid-state imager 102 to capture images through the LCD layer 206, the LCD layer 206 can be configured with a light transmissive region 208 located in front of the solid-state imager 102, allowing light to enter the solid-state imager 102 through the LCD layer 206. The transmissive region 208 includes one or more embedded refractive lens elements that focus transmitted light onto the photosensitive area of the solid-state imager 102. The single solid-state imager 102 with transmissive region 208 forms a video capturing system.

Figure 3:
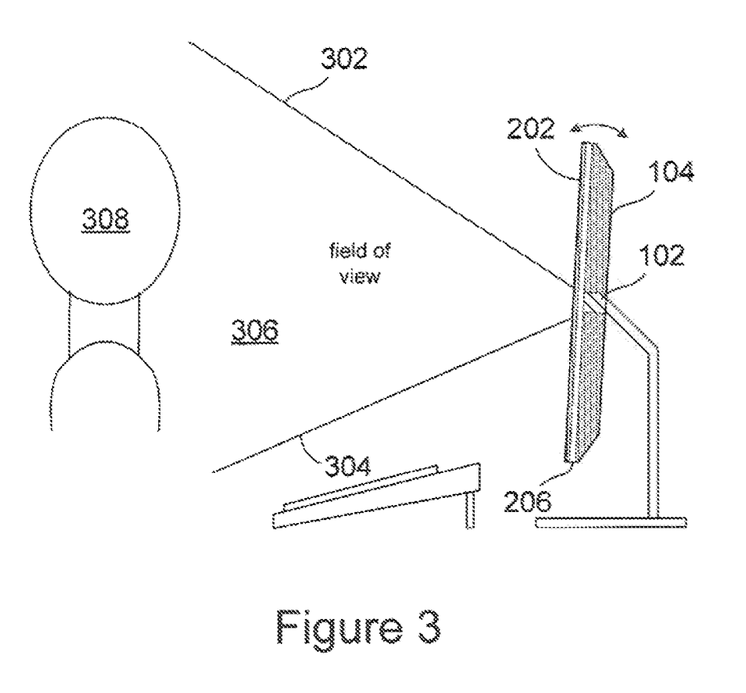
FIG. 3 shows a cross-sectional view of the display along a line I-I, shown in FIG. 1, configured and operated in accordance with one or more embodiments of the present invention.

The solid-imager imager 102 captures images of objects located within a cone-shaped field-of-view ("FOV") emanating from the solid-state imager 102. FIG. 3 shows a cross-sectional view of the display 104 along a line I-I, shown in FIG. 1, configured and operated in accordance with one or more embodiments of the present invention. Lines 302 and 304 mark top and bottom boundaries, respectively, of a cross-sectional view of the FOV 306 associated with the solid-state imager 102. The FOV 306 corresponds to a region of space that is visible to the solid-state imager 102. Objects located outside the FOV 306 are not captured by the solid-state imager 102. As shown in the example of FIG. 3, the display 104 can be angled to adjust the angle of the cone of the FOV 306, such as to adjust the FOV 306 to include a front view of display user 308.

Embodiments of the present invention are not limited to positioning the solid-state imager 102 in the center of the display. In other embodiments, the solid-state imager 102 can be located in any suitable place within the display 100 for capturing video images.

Figure 4:
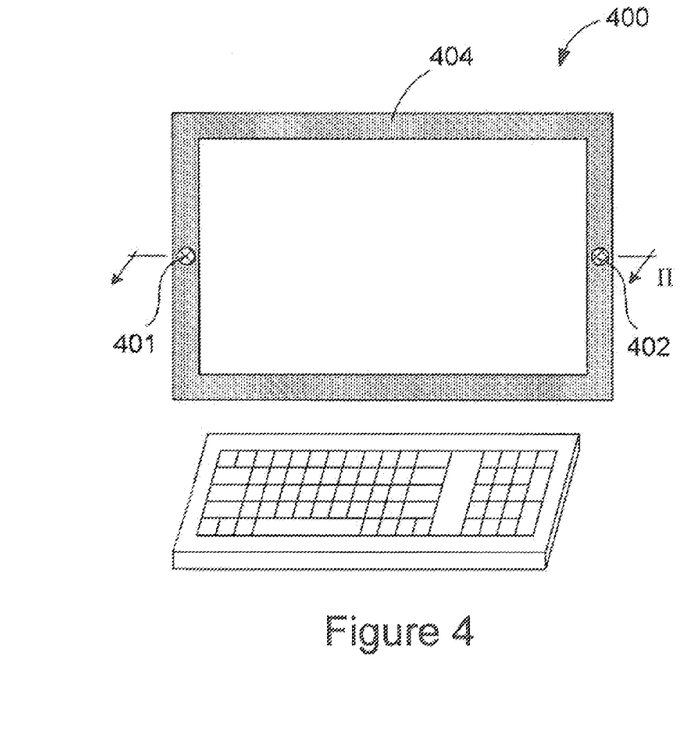
FIG. 4 shows a frontal-view of a second video display configured in accordance with one or more embodiments of the present invention.

FIG. 4 shows a frontal-view of an exemplary fourth video display system configured in accordance with one or more embodiments of the present invention. The video display system includes a display 400 and a video capture system comprising a first solid-state imager 401 and a second solid-state image 402, both of which are integrated into a display frame 404. As shown in the example of FIG. 4, the solid-state imagers 401 and 402 are positioned at approximate vertical center within the left and right margins of the frame 406.

Figure 5:
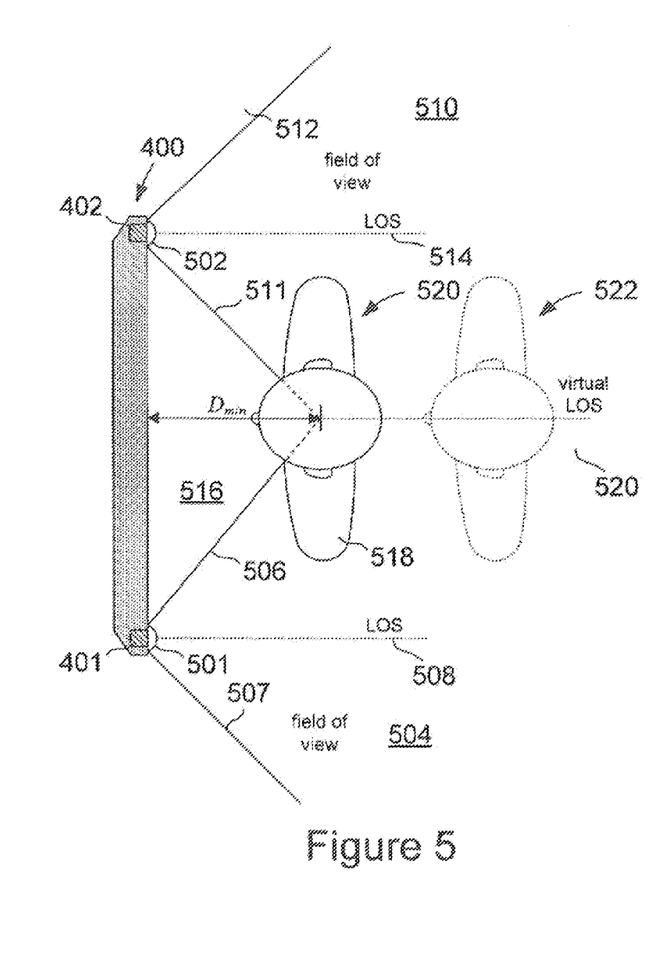
FIG. 5 shows a cross-sectional view of the display along a line II-II, shown in FIG. 4, in accordance with one or more embodiments of the present invention.

FIG. 5 shows a cross-sectional view of the display 400 along a line II-II, shown in FIG. 4, in accordance with one or more embodiments of the present invention. The video capturing system comprising solid-state imagers 401 and 402 can include sensor imaging lenses 501 and 502, respectively, configured and positioned to widen the FOVs associated with the solid-state imagers 401 and 402. FIG. 5 shows a representation of a first FOV 504 associated with the solid-state imager 401 and lens 501 with cross-sectional field boundaries 506 and 507 and line-of-sight ("LOS") 508, and a representation of a second FOV 510 associated with the solid-state imager 402 and lens 502 with cross-sectional field boundaries 511 and 512 and LOS 514. Objects located within either FOV 504 or FOV 510 can be captured by the corresponding solid-state imager.

However, as shown in the example of FIG. 5, FOVs 504 and 510 do not include a region of space 516 directly in front of the display 400 between the field boundaries 506 and 511. Frontal views of objects located within the region 514 cannot be captured by either of the solid-state imagers 401 and 402, creating a minimum distance $D_{min}$ for placing objects in front of the display 400. For example, FIG. 5 includes a top view of a person 518 located at two different distances from the display 400. At the first distance 520, a portion of the person's head is located within the region 516 and outside FOVs 504 and 510. Thus, the person's face cannot be captured by either solid-state imager 401 or 402, resulting in an un-resolvable image of the person 518. On the other hand, when the person is located farther from the display 400 at a second distance 522, the person's face falls within the FOVs 504 and 510, enabling an image of the person 518 to be resolved.

For objects placed within the FOVs 504 and 510, both solid-state images 401 and 402 capture images off-axis with LOS 508 and 514. Embodiments of the present invention can include the use of a view synthesis algorithm implemented on a computing device that take two or more images of an object from different perspective views and re-create a virtual frontal image of the object with face frontal perspective. For example, the person 518, shown in FIG. 5, is located within the FOVs 504 and 510 but is not located along either LOS 508 or 514, resulting in two different perspective views. Using an appropriate view synthesis algorithm, a frontal perspective view of the person 518 can be recreated as if the person's image had been captured by a virtual solid-state imager located in front of the display 400 with virtual LOS 520.

In other embodiments, rather than simply recreating a two-dimensional frontal view of objects placed within the FOVs 504 and 510, other types of view synthesis algorithms can be implemented with display embodiments of the present invention to recreate three-dimensional images of objects placed within FOVs 504 and 510.

In certain embodiments, the solid-state imagers 401 and 402 can be fixed in place and the position of the display 400 adjusted to control the direction of the lines-of-sight 508 and 514. In other embodiments, the video capturing system can include two pivot assemblies, with each of the solid state imagers 401 and 402 mechanically coupled to one pivot assembly, such as corresponding ring pivot assemblies, embedded within the frame 404 of the display 400. Independent pivot assemblies enable the solid-state imagers 401 and 402 to be independently moved during operation in order to reposition the angle of the cones (i.e., lines-of-sight 508 and 514) associated with the FOVs 504 and 510 and ultimately reposition a virtual FOV associated with the virtual LOS 520. The pivot assemblies for each solid-state imager 401 and 402 can be operated manually or operated by a mechanical means.

Figure 6:
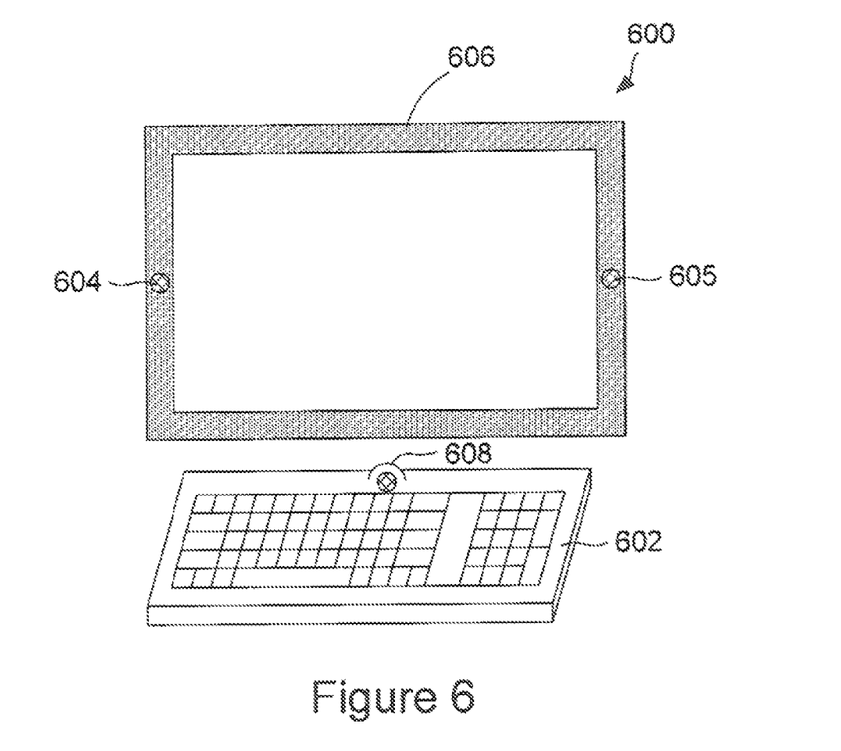
FIG. 6 shows a frontal-view of a third video display and keyboard configured in accordance with one or more embodiments of the present invention.

FIG. 6 shows a frontal-view of an exemplary third video display system configured in accordance with one or more embodiments of the present invention. The video display system comprises a display 600, a first solid-state imager 604, and a second solid-state image 605, both of which are integrated into a frame 606 of the display 600. As shown in the example of FIG. 6, the solid-state imagers 604 and 605 are positioned at approximate vertical center within the left and right margins of the frame 606. Keyboard 602 includes a third solid-state imager 608. The solid-state imagers 604, 605, and 608 form a video capturing system.

Figure 7:
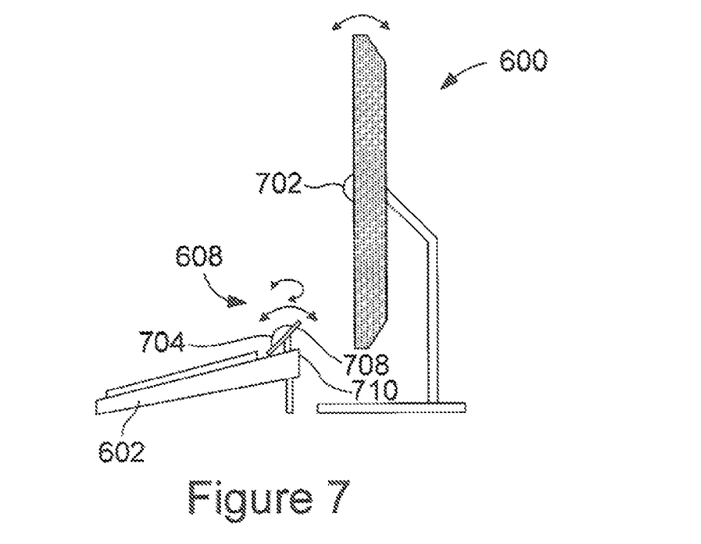
FIG. 7 shows a side view of the display and keyboard, shown in FIG. 6, configured in accordance with one or more embodiments of the present invention.

FIG. 7 shows a side view of the display 600 and keyboard 602 configured in accordance with one or more embodiments of the present invention. The video capturing system may include sensor imaging lens, such as lens 702 and 704, placed over the solid-state imagers 604, 605, and 608. The lenses can be used to broaden the FOVs associated with solid-state imagers 604, 605, and 608. In certain embodiments, the video capturing system can include a support structure for supporting the solid-state imager 608 on the keyboard 602 in a fixed position. In other embodiment, as shown in the example of FIG. 7, the video capturing system can include a pivot assembly for moving the solid-state imager 608. The pivot assembly includes a movable stage upon which the solid-state imager 608 is mounted and supported by one or more posts 710 connected to the keyboard 602. In certain embodiments, the movable stage 708 can be manually rotated and pivoted up and down in order to control the line-of-sight of the solid-state imager 608, and the display 600 can be angled to adjust lines-of-sight associated with the solid-state imagers 604 and 605. In other embodiments, the movable stage 708 can be mechanically coupled to a mechanical means for repositioning the stage 708. In other embodiments, the stage 708 and posts 710 can be implemented within the keyboard 602. In other embodiments, the movable stage 708 can be mechanically coupled to a pivot ring assembly embedded in the keyboard 602 for manually or automatically repositioning the stage 708. In other embodiments, the video capturing system can include two pivot assemblies embedded within the frame 606, with each of the solid state imagers 604 and 605 mechanically coupled to one of the pivot assemblies, as described above with reference to the display 400.

A minimum distance for placing objects in front of the display 600 also exists as described above with reference to the display 400. For objects placed within the FOVs of the solid-state imagers 604, 605, and 608 images are captured off-axis with associated lines-of-sight. Embodiments of the present invention can include the use of a view synthesis algorithm implemented on a computing device that takes the three off-axis images captured by the imagers 604, 605, and 608 and recreates a virtual image of the object with face frontal perspective along a virtual line-of-sight. In other embodiments, rather than simply recreating a two-dimensional frontal view of objects placed within the FOVs of the solid-state imagers 604, 605, and 608, other types of view synthesis algorithms can be implemented to recreate three-dimensional images of objects placed in front of the display 600 beyond the minimum distance.

Figure 8:
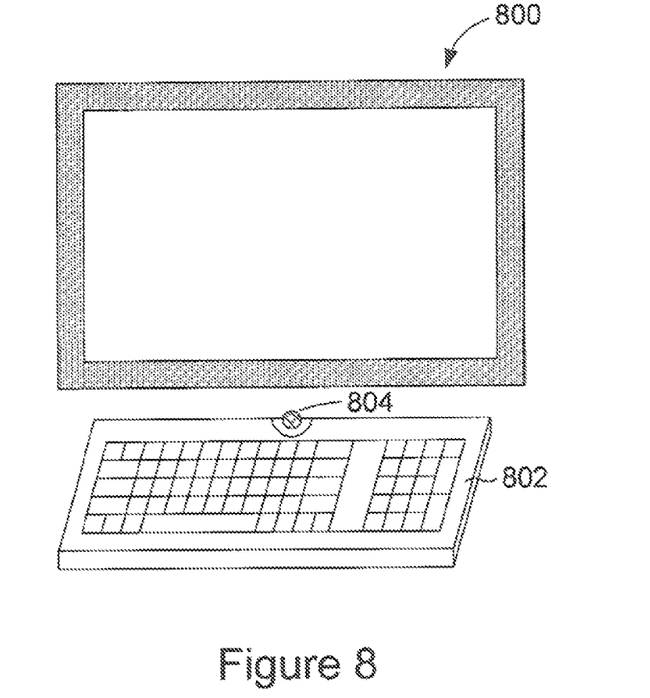
FIG. 8 shows a frontal-view of a fourth video display and keyboard configured in accordance with one or more embodiments of the present invention.

FIG. 8 shows a frontal-view of an exemplary fourth video display system configured in accordance with one or more embodiments of the present invention. As shown in the example of FIG. 8, the video display system includes a video capture system comprising a solid-state imager 804 integrated with a keyboard 802. The solid-state imager 804 is directed toward the screen of the display 800 to capture images from the screen of the display 800. In other words, the screen of the display 800 can be operated as a reflective device that reflects images of objects placed in front of the display 800. The reflected images can then be captured by the solid-state imager 804. Various embodiments for configuring and operating a display as a reflective device are described below.

Figure 9:
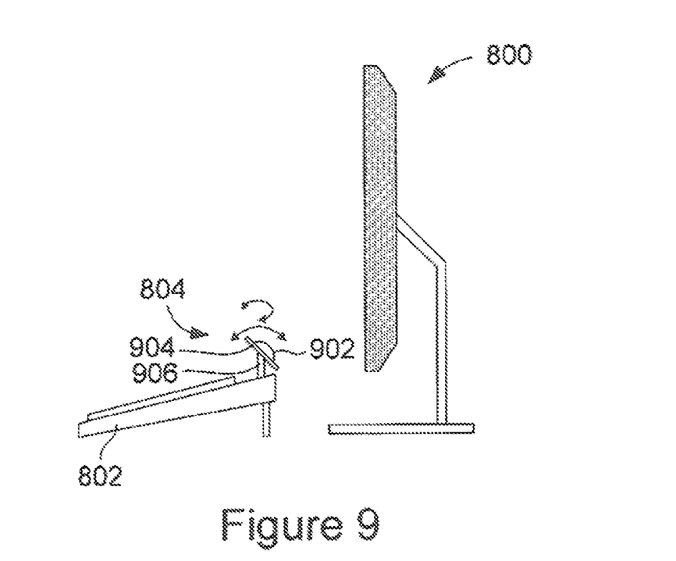
FIG. 9 shows a side view of the display and keyboard, shown in FIG. 9, configured in accordance with one or more embodiments of the present invention.

FIG. 9 shows a side view of the display 800 and keyboard 802 configured in accordance with one or more embodiments of the present invention. The video capture system may include a convex lens 902 placed over the solid-state imager 804 for a wider FOV. In certain embodiments, the video capturing system can include a support structure for holding the solid-state imager 804 on the key board in a fixed position. In other embodiment, the video capturing system can include a pivot assembly mechanically coupled to the solid-state imager 804. For example, as shown in the example of FIG. 9, a pivot assembly for changing the position of the solid-state imager 804 can be a movable stage 904 supported by one or more posts 906 connected to the keyboard 802. In certain embodiments, the movable stage 904 can be manually rotated and pivoted up and down in order to control the FOV of the solid-state imager 804, and the display 800 can also be angled. In other embodiments, the movable stage 902 can be mechanically coupled to a mechanical means for repositioning the stage 902. In other embodiments, the stage 904 and one or more posts 906 can be implemented within the keyboard 802. In other embodiments, the movable stage 904 can be mechanically coupled to a pivot ring assembly embedded in the keyboard 802 for manual or automatic repositioning of the stage 904.

Figure 10:
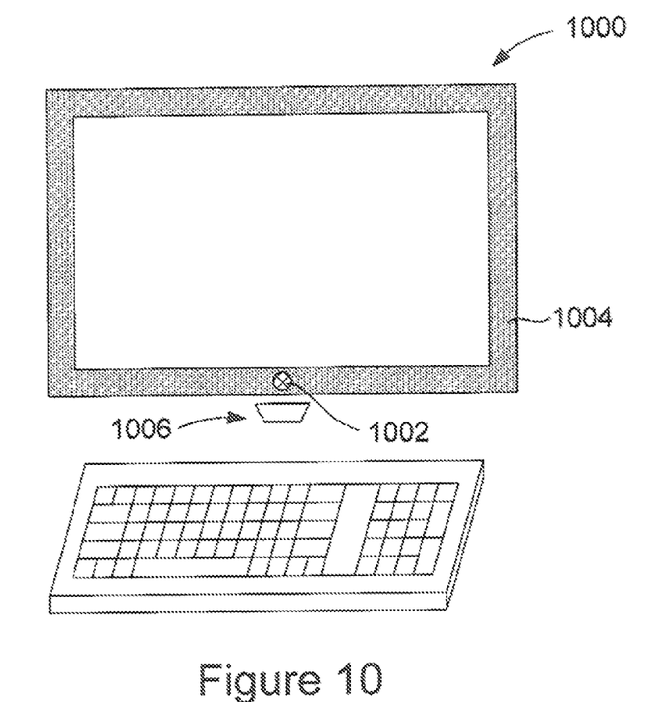
FIG. 10 shows a frontal-view of a fifth video display configured in accordance with one or more embodiments of the present invention.

FIG. 10 shows a frontal-view of an exemplary fifth video display system configured in accordance with one or more embodiments of the present invention. As shown in the example of FIG. 10, the video display system includes a display 1000 and a video capture system comprising a solid-state imager 1002 incorporated into a frame 1004 of the display 1000 and a reflective element 1006 that directs reflected images from the screen of the display 1000 to the solid-state imager 1002. In other words, the screen of the display 1000 is operated as a reflective device that reflects images of objects placed in front of the display 1000. The reflected images are directed by the reflective element 1006 to the solid-state imager 1004.

Figure 11:
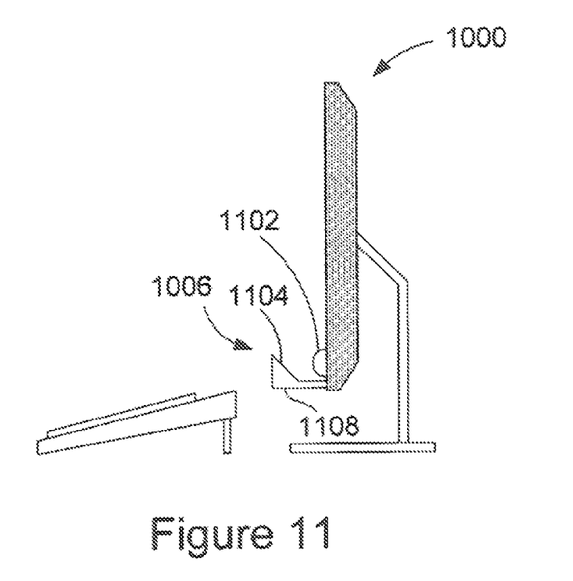
FIG. 11 shows a side view of the display, shown in FIG. 10, configured in accordance with one or more embodiments of the present invention.

FIG. 11 shows a side view of the display 1000 configured in accordance with one or more embodiments of the present invention. The video capturing system 1006 includes a lens 1102 camera 1002 may include a convex lens 1102 placed over a solid-state imager (not shown) embedded within the frame 1004 for a wider FOV. As shown in the example of FIG. 11, the reflective element 1006 comprises a mirror 1104 and a support structure 1106 that holds the mirror 1104. The support structure 1106 can be configured to include a pivot assembly enabling the mirror 1104 to be repositioned to reflect images reflected from the display 1000 into the camera 1002.

Figure 12:
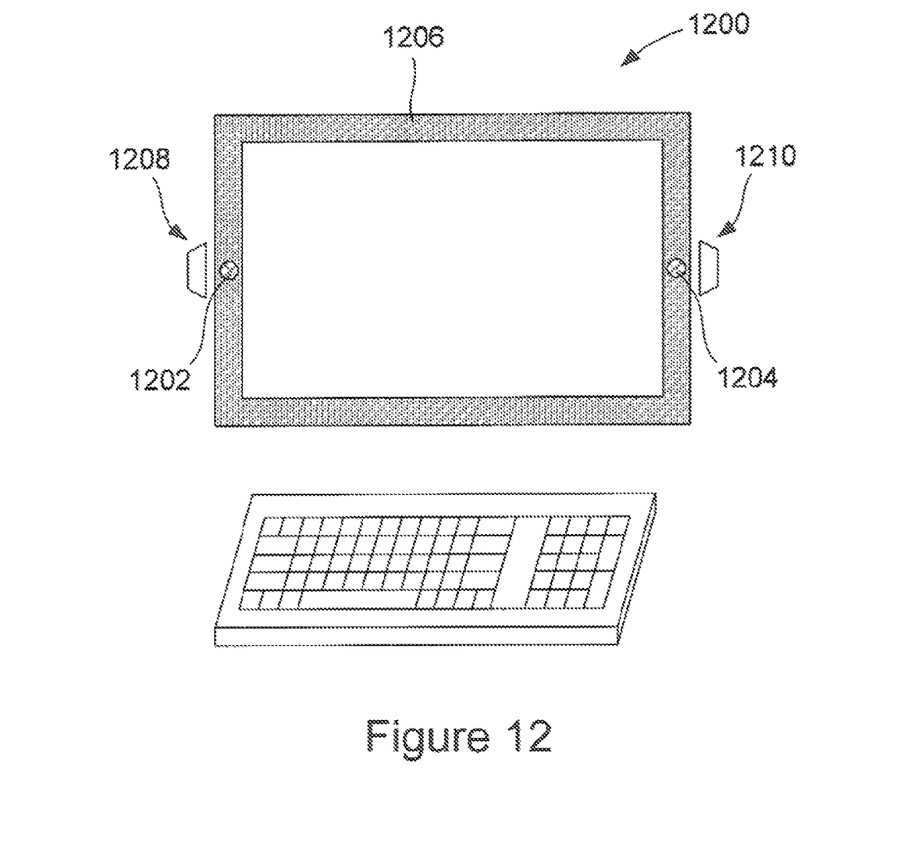
FIG. 12 shows a frontal-view of a sixth video display configured in accordance with one or more embodiments of the present invention.

FIG. 12 shows a frontal-view of an exemplary sixth video display system configured in accordance with one or more embodiments of the present invention. As shown in the example of FIG. 12, the video display system includes a display 1200 and a video capture system comprising a first solid-state imager 1202 and a second solid-state imager 1204 incorporated into a frame 1206 of the display 1200. The first and second imagers 1202 and 1204 are positioned at approximate vertical center within the left and right margins of the frame 1206 The video capture system of the display 1200 also includes a first reflective element 1208 that directs images reflected from a first perspective of the display 1200 to the solid-state imager 1202 and includes a second reflective element 1210 that directs images reflected from a second perspective of the display 1200 to the solid-state imager 1204. In other words, the screen of the display 1000 is operated as a reflective device that reflects images of objects placed in front of the display 1000.

Figure 13:
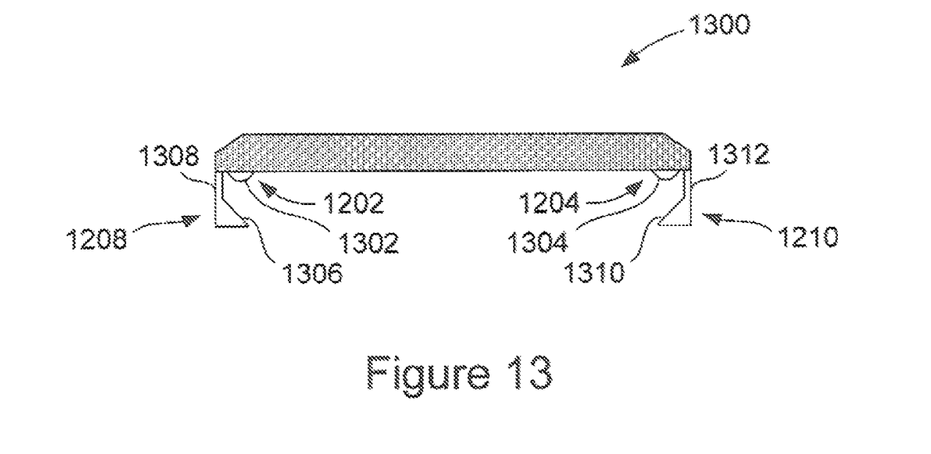
FIG. 13 shows a top-view of the display, shown in FIG. 12, configured in accordance with one or more embodiments of the present invention.

FIG. 13 shows a top-view of the display 1200 configured in accordance with one or more embodiments of the present invention. The video capturing system may include convex lenses 1302 and 1304 placed over the solid-state imagers (not shown) embedded within the frame 1206, for wider FOVs. As shown in the example of FIG. 11, the reflective element 1208 comprises a mirror 1306 and a support structure 1308 that holds the mirror 1306, and the reflective element 1210 comprises a mirror 1310 and a support structure 1312 that holds the mirror 1310. The support structures 1308 and 1312 can be configured to include pivot assemblies enabling the mirrors 1306 and 1310 to be repositioned to reflect images reflected from. the display 1300 into the corresponding solid-state imagers 1202 and 1204. Embodiments of the present invention can include the use of a view synthesis algorithm implemented on a computing device that take two or more images of an object from different perspective views and recreate a virtual frontal image of the object with face frontal perspective.

As described above with reference to FIGS. 8-13, a screen of a display can be operated as a reflective device that reflects images of objects, such as a display viewer. The reflected images can then be captured by the solid-state imager. A number of different embodiments for generating relective images from the screen of display are now described. Note that embodiments of the present invention are not limited to just the embodiments described below.

In certain embodiments, native faint images reflected from the screen of a display can be used in conjunction with image processing algorithms that subtract known images exhibited on the display from the reflected images.

In other embodiments, a high gloss transparent film can be placed on a display screen in order to increase reflectance of native images reflected from the screen of a display can be used in conjunction with image processing algorithms that subtract known images exhibited on the display from the reflected images.

In other embodiments, a polarization dependent reflective film can be placed on the screen of the display. The polarization dependent reflective film reflects incident light with a particular polarization, which is captured by the solid-state imager. In order to capture images of the objects placed in front of the display, processing algorithms can be used to subtract known images exhibited on the display from the reflected images captured by the one or more solid-state imagers.

In other embodiments, a chromatic dependent film can be placed on the screen of the display. The chromatic film reflects incident wavelengths in specific portions of the visible spectrum. For example, the chromatic film can be configured to reflect narrow bands in the red, green, and blue portions of the visible spectrum such that color images can be captured by the one or more solid-state imagers. In order to capture images of the objects placed in front of the display, processing algorithms can be used to subtract known images exhibited on the display from the reflected images captured by the one or more solid-state imagers.

Figure 14:
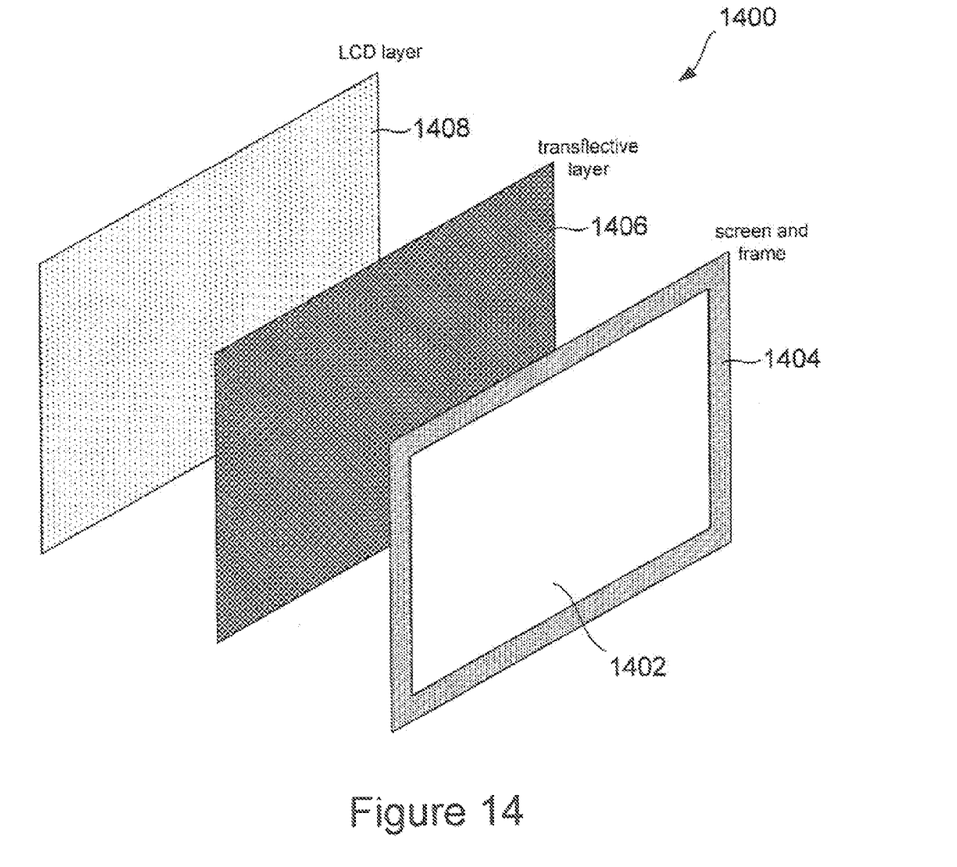
FIG. 14 shows an exploded isometric view of a display configured as a reflective element in accordance with one or more embodiments of the present invention.

In still other embodiments, a display can be configured with a transflective layer. FIG. 14 shows an exploded isometric view of an exemplary display 1400 configured and operated to reflect light from objects in accordance with one or more embodiments of the present invention. As shown in the example of FIG. 14, the display 1400 is configured with a screen 1402 and surrounding frame 1404, a transflective layer 1406 placed behind the screen 1402, and an LCD layer 1408 behind the transflective layer 1406. The transflective layer 1406 can be configured with an array of multiple tiny reflective elements that enable the transmission of images produced by the LCD layer 1408 and reflect light incident on the screen 1402. The display 1400 can be operated in either a projection mode and a reflection mode, which are synchronized with the solid-state imager being turned "off" and turned "on," respectively.

Figure 15:
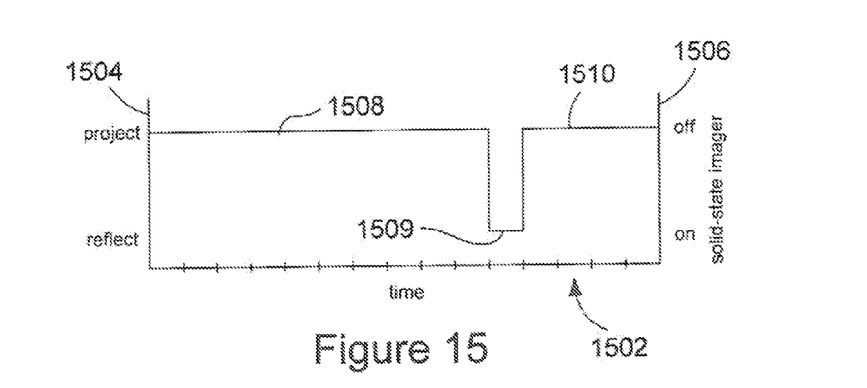
FIG. 15 shows of a plot representing operation of the display, shown in FIG. 14, in accordance with one or more embodiments of the present invention.

FIG. 15 shows of a plot representing the exemplary operation of the display 1400 synchronized with the solid-state device. Axis 1502 represents time and is divided into time slots that each represent a duration over which a frame of an image is exhibited by the display 1400 for viewing, axis 1104 represents the projection and reflection modes of the display 1400, and axis 1506 represents the "on" and "off" states of the solid-state imager. Line 1508 corresponds to the display 1400 operated in projection mode for 10 frames in which the solid-state imager is turned "off." Line 1509 represents the display switched to reflection mode, in which the display 1400 operates as a reflective mirror and the solid-state imager is switched "on" in order to capture images in the light reflected from the display 1400. During the time frame when the display 1400 is operated in reflection mode, the LCD layer 1408 may no longer be turned "on" or may be dimmed in order to limit interference with the light reflected from the transflective layer 1406 and captured by the solid-state imager. Line 1510 represents the display switched back to projection mode and the solid-state imager is turned "off."

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A video display system for a video telephone conversation, the video display system comprising:
   a reflective display screen; and
   a video capturing system configured to capture line-of-sight video images of a first person of the video telephone conversation while the first person looks at the display screen from a first side of the display screen,
   wherein the video capturing system comprises one or more solid-state imagers positioned to the first side of the display screen and one or more reflective elements positioned to the first side of the display screen, the one or more reflective elements to direct an image of the first person reflected by the display screen onto the one or more solid-state imagers, the one or more solid-state imagers to capture the image of the first person as reflected by the display screen and directed by the one or more reflective elements,
   wherein the video display system enables establishment of eye contact between the first person of the video telephone conversation and a second person of the video telephone conversation as exhibited on the display screen.

2. The system of claim 1 wherein the reflective display screen reflects images of objects in front of and spaced from the display screen.

3. The system of claim 1 wherein the one or more solid-state imagers are integrated into a frame of the display screen and the one or more reflective elements are disposed on the frame of the display screen.

4. The system of claim 1 wherein the video capturing system comprises:
   a first solid-state imager integrated into a frame surrounding the display screen; and
   a second solid-state imager integrated into the frame surrounding the display screen, wherein the first and second solid-state imagers are positioned at approximate vertical center within left and right margins of the frame, wherein views captured by the first and second solid-state imagers are synthesized to recreate face frontal views of objects placed in front of the display screen.

5. The system of claim 4 wherein the video capturing system further comprises:
   a first lens configured to widen a field of view associated with the first solid-state imager; and a second lens configured to widen a field of view associated with the second solid-state imager.

6. The system of claim 4 wherein the video capturing system further comprises:
a first pivot assembly configured to reposition a line-of-sight of the first solid-state imager; and
a second pivot assembly configured to reposition a line-of-sight of the second solid-state imager.

7. The system of claim 1 wherein the video capturing system comprises:
a first solid-state imager integrated into a frame of the display screen;
a second solid-state imager integrated into the frame of the display screen; and
a third solid-state imager integrated into a keyboard, wherein the first and second solid-state imagers are positioned at approximate vertical center within left and right margins of the frame, and wherein views captured by the first, second, and third solid-state imagers are synthesized to recreate face frontal views of objects placed in front of the display screen.

8. The system of claim 7 wherein the video capturing system further comprises:
a first lens configured to widen a field of view associated with the first solid-state imager;
a second lens configured to widen a field of view associated with the second solid-state imager; and
a third lens configured to widen a field of view associated with the third solid-state imager.

9. The system of claim 7 wherein the video capturing system further comprises:
a first pivot assembly configured to reposition a line-of-sight of the first solid-state imager;
a second pivot assembly configured to reposition a line-of-sight of the second solid-state imager; and
a third pivot assembly configured to reposition a line-of-sight of the third solid-state imager.

10. The system of claim 1 wherein the video capturing system comprises:
a solid-state imager integrated into a keyboard and positioned to capture images reflected by the display screen; and
a lens disposed on the solid-state imager and configured to widen the field of view of the solid-state imager.

11. The system of claim 10 wherein the video capturing system further comprises:
a pivot assembly integrated in the keyboard and mechanically coupled to the solid-state imager, the pivot assembly operable to change a line-of-sight of the solid-state imager.

12. The system of claim 1 wherein the video capturing system comprises:
a solid-state imager integrated into a frame of the display screen; and
a lens disposed on the solid-state imager and configured to widen a field of view of the solid-state imager.

13. The system of claim 12 wherein the video capturing system comprises:
a reflective element disposed on the frame of the display screen, the reflective element positioned to direct a reflected view of an image of objects placed in front of the display screen onto the solid-state imager.

14. The system of claim 1 wherein the reflective display screen comprises a transflective layer disposed behind a screen and configured to be operated in a projection mode to transmit images to users facing the screen and configured to be operated in a reflection mode to reflect light incident on the screen.

15. A video display system, comprising:
a display screen to reflect an image of a person looking at the display screen;
one or more solid-state imagers to capture one or more views of the image of the person as reflected by the display screen; and
one or more reflective elements to reflect and direct the image of the person as reflected by the display screen onto the one or more solid-state imagers,
wherein the one or more reflective elements, the one or more solid-state imagers, and the person are positioned to a same side of the display screen,
wherein the one or more solid-state imagers are to capture the image of the first person as reflected by the display screen and directed by the one or more reflective elements.

16. The system of claim 1 wherein the person looking at the display screen comprises a first person of a video telephone conversation, and wherein the display screen is to exhibit a second person of the video telephone conversation.

17. The system of claim 1 wherein the one or more solid-state imagers are integrated into a frame of the display screen and the one or more reflective elements are supported from the frame of the display screen.

18. The system of claim 1 wherein the one or more solid-state imagers are integrated into a keyboard.

19. The system of claim 1 wherein the display screen comprises a transflective layer disposed behind a screen, the transflective layer to be operated in a projection mode to transmit images to users facing the screen and operated in a reflection mode to reflect light incident on the screen.

20. A video display system, comprising:
a display screen to reflect an image of a person looking at the display screen;
one or more reflective elements to further reflect the reflected image of the person; and
one or more solid-state imagers to receive the further reflected image of the person and capture one or more views of the person looking at the display screen as reflected by the display screen and directed onto the one or more solid-state imagers by the one or more reflective elements,
the person, the one or more reflective elements, and the one or more solid-state imagers to be disposed on positioned to one side of the display screen.

* * * * *